Oct. 16, 1928.   1,687,662
C. J. FAY
SANDWICH TOASTER
Filed June 4, 1927   2 Sheets-Sheet 1

INVENTOR
Carl J. Fay
BY
Wesley G. Carr
ATTORNEY

Oct. 16, 1928.

C. J. FAY 1,687,662

SANDWICH TOASTER

Filed June 4, 1927        2 Sheets-Sheet 2

INVENTOR

Carl J. Fay.

BY
ATTORNEY

Patented Oct. 16, 1928.

1,687,662

UNITED STATES PATENT OFFICE.

CARL J. FAY, OF MANSFIELD, OHIO, ASSIGNOR TO WESTINGHOUSE ELECTRIC & MANUFACTURING COMPANY, A CORPORATION OF PENNSYLVANIA.

SANDWICH TOASTER.

Application filed June 4, 1927. Serial No. 196,413.

My invention relates to electrically heated cooking devices and particularly to electrically heated sandwich toasters.

An object of my invention is to provide a relatively simple and compact sandwich toaster.

Another object of my invention is to provide a cooking device comprising a lower casing, an upper casing pivotally mounted on the lower casing, and resilient means in the lower casing for partially supporting the weight of the upper casing when in its closed position.

In practicing my invention, I provide a lower casing of box shape, an upper casing which is pivotally mounted on a bail and electrically heated baking surfaces mounted in the respective cases. A single resilient metal bar holds a baking surface in its proper operative position relatively to the lower casing and a baffle plate is located therebelow.

A member of U-shape is located in the lower casing and is resiliently supported above a closure plate, the ends of the two arms projecting above the top of the lower casing, vertically extending recesses being provided in the inside of the side walls of the lower casing to constitute guides for the member of U-shape. Suitable electric conductors are provided to permit of connecting the resistor members associated with the upper and lower baking surface, as well as to permit of energizing them.

A sandwich toaster 11 comprises a lower casing 12, of substantially box shape and rectangular in section, an upper casing 13 and a bail 14 for moving the upper casing relatively to the lower casing. Both casings may be made of cast metal and I prefer to use aluminum for this purpose in order to reduce the weight of the device as much as possible. The upper casing 13 is relatively shallow as compared with the lower casing.

Figure 1:
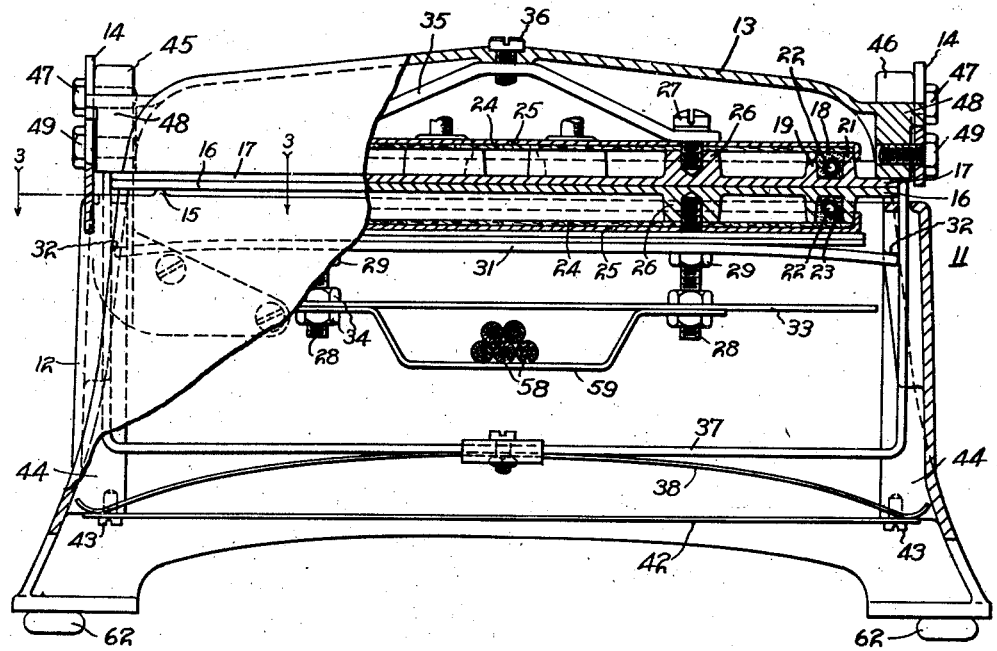
Figure 1 is a view, in front elevation of a device embodying my invention, portions being broken away and parts being shown in section.
Figure 3:
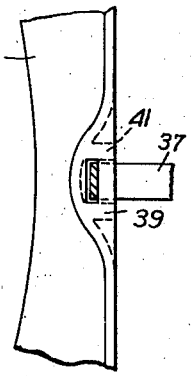
Fig. 3 is a horizontal sectional view taken on the line III—III of Fig. 1, and, Fig. 4 is a view, in end elevation, of a device embodying my invention.
Figure 4:
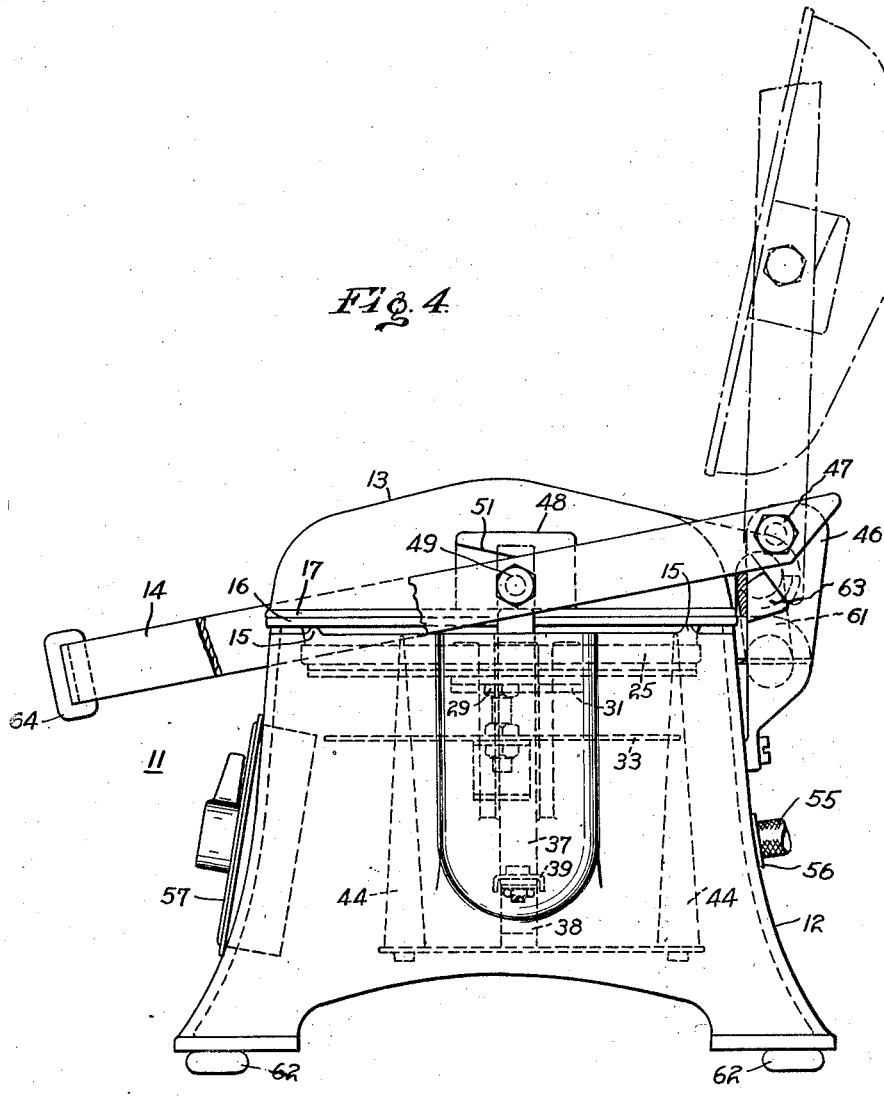

The upper edge of the lower casing 12 is provided with a plurality of spaced integral extensions or lugs 15, some of which are shown in Figs. 1 and 4, the outer ends of these lugs being operatively engaged by the inner face of a baking surface 16 which is associated with the lower casing. A similar baking surface 17 is operatively associated with the upper casing 13, the rim portion of which is smooth, substantially as shown in Fig. 1 of the drawing.

The outer face of the respective baking surfaces or members 16 and 17 are smooth, while the inner face thereof is provided with a peripheral groove 18 formed by two parallel-extending wall portions 19 and 21.

A helically wound resistor wire 22 is located in the groove 18 and is tightly held therein by a mass 23 of magnesium oxide. The helically wound resistor wire 22 is placed within an open helix of metallic magnesium strip, the two members being then located in the groove 18 and subjected to the action of high-temperature steam or water for such length of time as will cause the initially metallic magnesium to be transformed into a crystalline mass of electric-insulating magnesium oxide. The volume or mass of the magnesium is increased to about 200% of its initial volume so that not only is the resistor wire held tightly in the groove but there is provided a heat-conducting path from the resistor wire to the walls of the grooves having but little thermal resistance. This method is more particularly disclosed and claimed in Reissue Patent No. 16,340 to C. B. Backer.

A sheet 24 of asbestos is located against the outer edges of the walls 19 and 21, and a clamping plate 25 of sheet metal is located against the sheet 24. Lugs 26 are provided on the inner face of the baking members 16 and 17 which are of the same height as the walls 19 and 21, and a plurality of screws 27 extend through the plates 25 and 24 and into the lugs 26 to clamp the two plates in their proper operative positions against the walls of the grooves and the lugs. A plurality of studs 28 extend into the respective lugs 26 in the baking member 16 and have associated therewith nuts 29 which operatively engage a resilient metal bar 31 having a suitable opening therethrough. The ends of the bar 31 engage shoulder portions 32 integral with the side walls of the lower casings 12, these elements being shown more particularly in Fig. 1 of the drawing. By suitably locating the nuts 29 on the studs 28, it is possible to tightly clamp the baking member 16 against the lugs 15.

A baffle plate 33 is supported by the studs 28, pairs of nuts 34 being mounted on the respective studs to hold the baffle plate in spaced relation relatively to the baking surface 16 and more particularly below the resilient clamping bar 31. The baffle plate 33 restricts the flow of heat downwardly from the heating units.

A resilient member 35, of substantially U-shape and made of a metal bar, has its ends clamped against the plate 25 by the screws 27, substantially as shown in Fig. 1 of the drawing. A small bolt 36 extends through an opening in the casing 13 and has screw threaded engagement with the member 35 so that the baking member or surface 17 may be held in its proper operative position against the rim of the upper casing 13.

Figure 2:
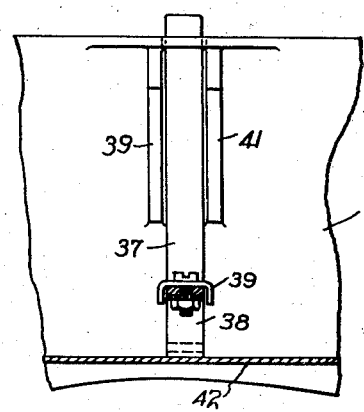
Fig. 2 is a fragmentary view illustrating a detail of the device embodying my invention.

A metal strap member 37, of substantially U-shape, is located within the lower casing, the ends of the arms extending above the top of the lower casing and being yieldingly pushed upwardly by a leaf spring 38 which is secured to the intermediate portion of the member 37 by a metal member 39, of substantially channel shape in lateral section, and a cooperating screw and nut shown in Figs. 1 and 2 of the drawings.

The inner surfaces of the side walls of the casing 12 are provided with vertically extending ribs 39 and 41 spaced apart a suitable distance to receive between them the end portions of the member 37, of U-shape. A bottom closure member 42 made of sheet metal is provided at the lower part of the casing 12 and is held in proper operative position by short bolts 43 which secure the plate 42 against shoulder portions 44 integral with the casing 12.

A plurality of lugs 45 and 46 are suitably bolted against the rear of the casing 12 adjacent the ends thereof to provide fixed hinge portions for the ends of the arms of the bail 14, bolts 47 providing the pivotal connection between the hinge lugs 45 and 46 and the bail 14.

The upper casing 13 is provided with laterally extending integral lugs 48 to permit of pivotally mounting the upper casing and the other members associated therewith, in the bail 14, this pivotal mounting being effected by bolts 49 extending through the bail 14 and having screw-threaded engagement with the lugs 48. The lugs 48 have the upper portion thereof overhanging the bail 14, and the shoulder thus provided is substantially arcuate, as shown at the numeral 51 in Fig. 4, in order that the pivotal movement of the casing 13, relatively to the bail 14, shall be limited.

A twin conductor cord 55 extends through an opening in the back wall of the casing 12, a bushing 56 of suitable electric-insulating material being provided to prevent grounding of the conductor cord against the walls of the opening. The outer end (not shown) of the conductor cord 55 has the usual connecting plug associated therewith. A snap switch 57 is mounted in the front wall of the casing, and such electric conductors 58 (see Fig. 1) as are necessary to connect the conductor cord with the switch may be carried by a metal supporting bracket 59 which is supported by the studs 28 and held thereon by the nuts 34.

A flexible metallic or armoured conduit 61 is provided between the upper and the lower casings in which suitable connecting conductors (not shown in detail) may be located to permit of electrically connecting the resistors 22 located in the upper and in the lower baking members, respectively.

Spacing members 62 may be secured to the bottom portion of the casing 12 in order to reduce the amount of heat conducted to any supporting surface upon which the toaster 11 may be located during operation.

It may be noted that the pivot bolts 47 are located above the plane of engagement of the two baking surfaces. This is for the reason that the device herein disclosed is to be used for toasting sandwiches so that the distance between the cooperating baking surfaces 16 and 17 will be relatively large and equal to at least twice the thickness of one slice of bread. When the upper casing is in the position shown in Fig. 4 of the drawing, a part of its weight will be carried by the member of U-shaped and more particularly by the spring 38 associated therewith. These members will insure that the full weight of the upper casing and of the baking surface, as well as that of the clamping plates, will not have to be carried by the sandwich located between the baking surfaces to have the outer surfaces of the two slices of bread toasted. The pivotal surface 51 of the lugs 48 permit the upper casing and, more particularly, the baking surface 17 to adjust itself to sandwiches of uneven thickness from front to back of the toaster, irrespective of the position of the bail 14. The lugs 45 and 46 may be provided with shoulder portions 63 to limit the turning movement of the bail 14 on these lugs. The position of the bail and of the upper casing, when in its open position, is shown by the broken lines in Fig. 4.

As the bail 14 is made of a metal bar, a handle 64 of heat-insulating material may be located on its intermediate portion so that the operator may actuate the bail at any time.

The device embodying my invention thus provides a relatively simple and compact sandwich toaster having resilient means associated therewith for partially supporting the weight of an upper casing thereof.

Various modifications may be made in the device embodying my invention without departing from the spirit and scope thereof, and I desire that only such limitations shall be placed thereon as are imposed by the prior art or are set forth in the appended claims.

I claim as my invention:

1. In an electric cooking appliance, in combination, a lower box-like casing, an upper casing movable toward and away from said lower casing, and a resiliently supported member of substantially U-shape in said lower casing for partially supporting said upper casing when it is located adjacent to the lower casing.

2. In an electric cooking appliance, in combination, a lower box-like casing, an upper casing movable toward and away from said lower casing, and a resiliently supported member of substantially U-shape in said lower casing and having its end portions projecting upwardly therefrom for partially supporting said upper casing when it is located adjacent to the lower casing.

3. In an electric cooking appliance, in combination, a lower box-like casing, an electrically heated cooking surface in the top of said casing, and a single resilient bar secured against the underside of the cooking surface and engaging shoulders in said casing for holding the cooking surface in proper operative position in said casing.

4. In an electrical cooking appliance, in combination, a box-like casing, a baking surface resting upon the upper edge thereof, a single resilient metal bar operatively secured to the baking surface at its lower face and having its ends engaging shoulders in the casing to hold the baking surface in its proper operative position in the casing, and a sheet metal plate spaced from and below said bar to reduce heat flow in a downward direction.

5. In an electrical cooking appliance, in combination, a box-like casing, having vertically-extending grooves at diametrically opposing points in the inner face of its wall, an upper casing having pivotal movement relatively to the lower casing, and a resiliently-supported member of U-shape movable in said grooves for partially supporting the weight of the upper casing when located on said lower casing.

6. In an electrical cooking appliance, in combination, a lower casing, a baking surface in the lower casing, a handle of U-shape pivotally mounted on the lower casing, and an upper casing with an associated baking surface pivotally mounted on said handle of U-shape to permit the upper baking surface to adjust itself to material located between the baking surfaces.

7. In an electric cooking appliance in combination, a lower casing, an upper casing, electrically heated baking surfaces in each of said casings, a strip of U-shape in the lower casing extending upwardly therefrom, a leaf spring secured to the strip of U-shape, and a heat-flow-reducing plate below said spring and operatively engaged thereby to yieldingly hold the strip of U-shape in its upper position to partially support the upper casing and baking surface.

In testimony whereof, I have hereunto subscribed my name this 27 day of May, 1927.

CARL J. FAY.